United States Patent [19]

Hughes et al.

[11] 4,159,683

[45] Jul. 3, 1979

[54] METHOD FOR REDUCING THE FORMATION OF SLAG AND SOOT FORMED FROM THE COMBUSTION OF CARBONACEOUS WASTE MATERIAL

[75] Inventors: John Hughes, Arlington Heights; Peter L. Maul, Addison, both of Ill.

[73] Assignee: American Colloid Company, Skokie, Ill.

[21] Appl. No.: 885,660

[22] Filed: Mar. 13, 1978

[51] Int. Cl.$^2$ ............................................. F23G 7/00
[52] U.S. Cl. ................................... 110/343; 110/346; 44/4; 44/5
[58] Field of Search ............... 110/238, 345, 346, 343; 44/1 D, 4, 5

[56] References Cited

U.S. PATENT DOCUMENTS

| 3,628,925 | 12/1971 | Milner | 44/4 |
|---|---|---|---|
| 3,630,696 | 12/1971 | Milner | 44/4 |
| 3,738,819 | 6/1973 | Milner et al. | 44/4 |
| 3,837,820 | 9/1974 | Kukin | 44/5 |

*Primary Examiner*—Kenneth W. Sprague
*Attorney, Agent, or Firm*—Poms, Smith, Lande, Glenny & Rose

[57] ABSTRACT

The amount of soot and slag formed during the combustion of carbonaceous waste material is appreciably reduced by combusting said waste material in the presence of at least 0.0001%, by weight, of sodium bentonite, based on the weight of carbonaceous material being combusted. The sodium bentonite may be added directly to the waste material before entering the furnace or the sodium bentonite may be added directly to the furnace.

11 Claims, No Drawings

METHOD FOR REDUCING THE FORMATION OF SLAG AND SOOT FORMED FROM THE COMBUSTION OF CARBONACEOUS WASTE MATERIAL

BACKGROUND OF THE INVENTION

The burning of organic waste material to provide energy in the form of heat is a problem because organic waste material is a "dirty" fuel which, during burning or combustion, forms a great deal of soot and slag. This is particularly true in the paper and sugar industry where, respectively, black liquor and bagasse are burned in furnaces to generate steam to be used in the respective processes. Not only is the soot and slag undesirable because it pollutes the atmosphere but the slag deposits on the furnace was which adversely affects the transfer of heat to the water. The same problems are also present in burning garbage because garbage is also a "dirty" fuel which produces a great amount of soot and slag which causes pollution and also deposit upon the surface of the furnace which adversely affects the efficiency of the furnace and may corrode the furnace walls.

Accordingly, it has long been a desideratum in the art to provide a simple but effective method for preventing the formation of soot and slag during the combustion of organic based material such as garbage, black liquor, and bagasse.

SUMMARY OF THE INVENTION

It is therefore the primary object of the present invention to disclose and provide a method for easily and efficiently reducing, by significant amounts, the amount of slag and soot formed during the combustion of carbonaceous waster material in a furnace by merely adding small amounts of an inexpensive material to the furnace during the combustion of the carbonaceous waste material.

It is a further object of the present invention to disclose and provide a method for reducing slag and soot formation during the combustion of carbonaceous waster material by adding thereto small amounts of sodium bentonite.

Another object of the present invention is to disclose and provide a method whereby black liquor, formed during the paper making process, can be used to provide heat for the paper making process by combusting the black liquor formed in the paper making process in the presence of sodium bentonite thereby reducing the amount of slag and soot formed during the combustion of the black liquor.

Another and further object of the present invention is to provide a method whereby bagasse is combusted in a furnace without formation of large amounts of soot and slag, said combustion taking place in the presence of a relatively small amount of sodium bentonite.

Still another object of the present invention is to embody a process for disposing of garbage in a non-polluting manner and utilizing the garbage's heat energy by combusting the garbage in the presence of sodium bentonite.

Other objects of the present invention will be apparent from the following detailed description of the preferred exemplary embodiments in which all parts and percentages are by weight unless expressly stated otherwise.

DESCRIPTION OF THE PREFERRED EMBODIMENT

In the presently preferred embodiments, reference will be made to black liquor, bagasse, and garbage, however, it is to be understood that the present invention is also applicable to other carbonaceous waste material which can be combusted in the presence of oxygen.

The present invention is predicated upon the suprising discovery that the amount of soot and slag formed during the combustion of organic waste material can be appreciably reduced by combusting the organic waste material in the presence of a relatively small amount of sodium bentonite. As is known in the art, bentonite is basically a montmorillonite clay and occurs as three different types. One type has two molecular layers of water, the second type only one molecular layer, and the third type has no water at all absorbed on the layers. An example of the first type having two molecular layers of water is southern or calcium bentonite. This type of bentonite will not expand in the presence of water. Sodium bentonite, which is used in the present invention, has only one molecular layer of water and will expand in water. This invention is restricted to that type of bentonite which contains only one molecular layer of water and will hereinafter be called sodium bentonite.

Because of the physical and chemical differences between calcium and sodium bentonite the two are not equivalent for most purposes and are, therefore, generally used in different environments. For example, sodium bentonite is useful in drilling mud and of little value for decolorizing because sodium bentonite is a high swelling and highly colloidal material. In contrast thereto, calcium bentonite does not swell and is useful for decolorizing purposes but has little or no value as an additive for drilling muds.

We have surprisingly found that sodium bentonite having only one molecular layer of water appreciably prevents the formation of soot and slag during the combustion of "dirty" fuels such as bagasse, garbage and black liquor.

The amount of sodium bentonite which is effective in preventing the formation of soot and slag produced from the combustion of carbonaceous waste material is surprisingly very small. For example, we have used as little as 0.0001%, by weight, of sodium bentonite, based on the weight of the carbonaceous waste material being combusted, and found that the formation of soot and slag is greatly reduced (i.e. more than 50%). We have also found that sodium bentonite is effective in large amounts, for example 10%, by weight, and more. However, utilizing such large amounts of sodium bentonite is uneconomical since lesser amounts of sodium bentonite reduce the soot and slag to the same extent as those larger amounts. Thus, there is no upper limit on the amount of sodium bentonite which may be used in the present invention. However, in general, the amount may vary from 0.0001% to as high as 5%, by weight, based on the amount of carbonaceous waste material with the preferred amount being from about 0.000125 weight percent to 0.5 weight percent. We have found, for example, that 0.25 pounds of bentonite per ton of bagasse or black liquor greatly reduces the amount of soot and slag when said organic waste material is combusted.

Turning now to the utilization of sodium bentonite to reduce the soot and slag formed during the combustion of black liquor, we have found that the sodium bentonite may be either added directly to the black liquor, to the "salt cake" which is added to the black liquor immediately prior its introduction into a furnace, or by merely adding the sodium bentonite to the furnace separately from the black liquor or salt cake.

As is known in the art, black liquor is produced when either of two methods are used in making paper. The first of these methods is the so-called soda process and the second method is the Kraft or sulfate process. Both of these methods are essentially the same in that both methods rely on an alkaline chemical solution to digest the wood to produce wood pulp. The alkaline solution contains about 60 grams of NaOH, 22 grams $Na_2S$, 15 grams of $Na_2CO_3$, and minor amounts of $Na_2SO_4$ and $Na_2SO_3$ per liter of water, it being understood that the amounts of these chemicals may vary.

Small chips of wood are placed in an alkaline solution in a digester and the resulting mixture heated for a sufficient length of time and at a sufficient pressure to remove all of the constituents, principally lignin, of the wood except the cellulose which is used to make paper. After the digestion is complete the alkaline solution is called black liquor and this black liquor is separated from the wood pulp (i.e. the cellulose) the black liquor containing the dissolved organic matter from the wood as well as the alkalis used to digest the wood.

In any event, the black liquor is separated from the wood pulp and the black liquor is thereafter concentrated so that it contains more than 50%, by weight, of solids and preferably 55% or greater, by weight of solids. In general the black liquor will contain between 50 weight % to 75 weight % of solids. This is preferably expressed in density so that, in general, the black liquor is concentrated so that it has a density of from 32° Be. to 40° Be. at 60° F. or even higher density but, in general, it is not necessary to further concentrate the black liquor since at such density (or total solids content) the black liquor will support combustion. The black liquor will contain from 5 weight % to 10 weight % inorganic solids.

After the black liquor has been concentrated as indicated above, it is transported to the furnace. Before the black liquor is burned in the furnace, in the Kraft process sodium sulfate is added (salt cake) and, in the soda process, either caustic soda or soda ash is added. After the addition of the salt cake or soda the mixture is combusted at a temperature of 1000° C. or higher to produce heat which in turn produces steam which can be used in the pulp-making process and the inorganic chemicals recovered from the resulting ash to be reused again in the digester.

In the presently preferred exemplary embodiment, the sodium bentonite is preferably added to the furnace by mixing the sodium bentonite with the make-up chemical, which in the case of the Kraft process, the make-up chemical is salt cake or sodium sulfate and in the soda process, soda ash or caustic soda. The amount of sodium bentonite added to the salt cake is sufficient so that 0.25 pounds of bentonite are present in the furnace for each ton of black liquor. We have conducted tests in a Kraft pulp mill and found that when such a mixture is burned the soot and slag produced during the combustion is reduced by more than 50%.

However, it should be noted, that it is not necessary to add the sodium bentonite to the furnace by first mixing it with the salt cake. The sodium bentonite could be added by mixing it directly with the black liquor or, alternatively, by merely adding it separately to the furnace while combustion is taking place or, for that matter, prior to combustion.

The procedure in combusting bagasse to reduce the soot and slag is similar to that used in combusting the black liquor referred to above except that in combusting bagasse the sodium bentonite is either added directly to the bagasse prior to its introduction to the furnace or, alternatively, sodium bentonite is added directly to the furnace and the bagasse combusted in the presence of the sodium bentonite.

As is known in the art, bagasse is a "dirty" fuel and is residue from sugar cane after the sugar has been extracted. In general, it is desirable to burn this bagasse in order to extract its energy so as to make the process of extracting the sugar from the cane more economical.

When extracting the sugar from the cane, the cane is first crushed in order to prepare the cane to absorb water which is subsequently sprayed thereon. The crushed cane is much like a sponge and water is sprayed on the crushed cane and then removed and this process continues until a substantial portion of the sugar is removed from the crushed cane. This crushed cane is called bagasse and after most of the sugar is removed the bagasse is conveyed to a furnace where the bagasse is burned in order to generate steam in the boilers. The bagasse, which is being conveyed to the furnaces will, in general, contain 50% or more of woody fiber and less than about 45% moisture. For example, the bagasse may contain 50% to 75% woody fiber and from about 45 or 49% moisture to 25% moisture.

We have found that in order to appreciably reduce the soot and slag which is formed during the combustion of the bagasse in the furnaces at approximately the same amount of sodium bentonite is necessary as in the combustion of the black liquor. In other words, the amount of sodium bentonite either added to the bagasse or to the furnace in which the bagasse is burned will be from about 0.0001% to 5%, by weight, based on the amount of bagasse (including the moisture in the bagasse). It is preferred if at least about 0.25 pounds of sodium bentonite is used per ton of bagasse (0.000125 weight %) to as high as 0.5 weight % of sodium bentonite based on the weight of the bagasse. This amount of sodium bentonite appreciably reduces the soot and slag formed during the combustion of the bagasse which is particularly importatnt because, as noted hereinbefore, the bagasse is burned to generate steam and the formation of slag in the furnaces adversely effect the heat transfer to the water in the boiler.

It should also be noted that in both the combustion of the bagasse and the black liquor (as well as the other carbonaceous waste material) the combustion is conducted in the presence of at least stoicheometric amount of oxygen and, preferably an excess of stoicheometric oxygen.

In some respects, the bagasse and black liquor are similar to garbage in that both black liquor and bagasse are "dirty" fuels since they contain many impurities vis-a-vis fuel oil, coal and the like. The same is also true of garbage and we have found that combusting garbage in the presence of sodium bentonite appreciably reduces the soot and slag formed during the combustion thereby allowing an economical method for disposing of garbage and, at the same time, using the heat obtained by the combustion of garbage for a variety of useful purposes including the generation of steam. Thus, it is particularly important in the case of garbage because the problem of disposing of carbonaceous waste materials produced by mankind has reached proportions. Thus, the present invention not only allows for disposing of the garbage without polluting our atmosphere but also allows using the energy contained in the garbage by, for example, burning the garbage to generate steam which can be used in a variety of ways.

It is generally preferred to insure that the garbage contains less than 50%, by weight, of moisture, and preferably from 50% to 25%, by weight, of moisture. As in the case of the black liquor, inorganic salt and the like do not adversely affect the present invention. Thus, the garbage can contain relatively large amounts of inorganic salts and still be effective. For example, the garbage may contain from 5% or 10% to as high as 20% or 25%, by weight, of various inorganic materials without adversely affecting the instant invention.

We claim:

1. A method for reducing the amount of slag and soot formed by the combustion of carbonaceous waste material in a furnace which comprises combusting said carbonaceous waste material in said furnace in the presence of at least 0.0001%, by weight, of sodium bentonite based on the weight of said carbonaceous waste material.

2. A method according to claim 1 wherein carbonaceous waste material contains less than 50%, by weight, of water.

3. A method according to claim 1 wherein the amount of sodium bentonite is from 0.0001%, by weight, to 5%, by weight, based on the weight of said carbonaceous waste material.

4. A method according to claim 1 wherein the amount of sodium bentonite is from 0.000125%, by weight, to 0.5%, by weight, based on the weight of said carbonaceous waste material.

5. A method according to claim 1 wherein the carbonaceous waste material is bagasse.

6. A method according to claim 1 wherein the carbonaceous waste material is black liquor containing lignin.

7. A method according to claim 1 wherein the carbonaceous waste material is garbage.

8. A method according to claim 1 wherein the carbonaceous waste material contains from 5% to 10%, by weight, of inorganic salts.

9. A method according to claim 6 wherein the black liquor contains from 5% to 10%, by weight of inorganic salts.

10. A method of reducing the amount of slag and soot formed by the combustion of black liquor containing lignin which comprises adding to a furnace black liquor containing more than 50%, by weight, of solids and adding sodium sulfate to the furnace, said sodium sulfate containing sodium bentonite in an amount of at least 0.0001%, by weight, based on the weight of said black liquor and combusting the black liquor in the presence of said sodium bentonite in said furnace.

11. A method according to claim 10 wherein the amount of sodium bentonite is between 0.000125% and 0.5%, by weight.

* * * * *